US007991202B2

(12) United States Patent
Ito et al.

(10) Patent No.: US 7,991,202 B2
(45) Date of Patent: Aug. 2, 2011

(54) IMAGE PROCESSING METHOD, IMAGE PROCESSING SYSTEM, IMAGE PROCESSING DEVICE, AND COMPUTER PROGRAM

(75) Inventors: Hisao Ito, Oita (JP); Kozo Baba, Oita (JP); Akiyoshi Tafuku, Oita (JP); Masatoshi Tohno, Kawasaki (JP); Taku Katagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1019 days.

(21) Appl. No.: 11/889,994

(22) Filed: Aug. 17, 2007

(65) Prior Publication Data

US 2007/0292000 A1 Dec. 20, 2007

Related U.S. Application Data

(63) Continuation of application No. PCT/JP2005/002468, filed on Feb. 17, 2005.

(51) Int. Cl.
*G06K 9/00* (2006.01)
(52) U.S. Cl. ......... 382/118; 382/168; 382/199; 382/260
(58) Field of Classification Search .................... 382/118
See application file for complete search history.

(56) References Cited

U.S. PATENT DOCUMENTS

| 5,680,481 | A | * | 10/1997 | Prasad et al. | 382/190 |
|---|---|---|---|---|---|
| 5,859,921 | A | * | 1/1999 | Suzuki | 382/118 |
| 6,055,323 | A | * | 4/2000 | Okumura | 382/118 |
| 6,072,892 | A | * | 6/2000 | Kim | 382/117 |
| 6,094,498 | A | * | 7/2000 | Okumura | 382/118 |
| 6,125,213 | A | * | 9/2000 | Morimoto | 382/263 |
| 6,718,050 | B1 | * | 4/2004 | Yamamoto | 382/117 |
| 6,907,136 | B1 | * | 6/2005 | Shigemori | 382/118 |
| 7,239,726 | B2 | * | 7/2007 | Li | 382/118 |
| 7,515,773 | B2 | * | 4/2009 | Adachi et al. | 382/291 |
| 7,522,752 | B2 | * | 4/2009 | Adachi et al. | 382/118 |
| 7,693,309 | B2 | * | 4/2010 | Shigemori | 382/118 |

(Continued)

FOREIGN PATENT DOCUMENTS

JP          7-225841         8/1995

(Continued)

OTHER PUBLICATIONS

Yeon-Sik Ryu, Se-Young Oh, "Automatic extraction of eye and mouth fields from a face image using eigenfeatures and multilayer perceptrons", Pattern Recognition, vol. 34, Issue 12, Dec. 2001, pp. 2459-2466.*

(Continued)

*Primary Examiner* — Sath V Perungavoor
(74) *Attorney, Agent, or Firm* — Staas & Halsey LLP

(57) ABSTRACT

There are provided an image processing method, and an image processing system, an image processing device, and a computer program product capable of detecting a position of a fringe portion of a detecting object such as an outline of a face of a driver with high precision, even when a variation of illuminance occurs locally in a system using, for example, an on-vehicle camera mounted on a vehicle for imaging the face of the driver. Luminance of pixels arranged in a first direction such as a horizontal direction of an image is subjected to quadric differential, and data based on a quadratic differentiation result is accumulated in a second direction such as a vertical direction, and based on an accumulated result, a position in the first direction of the detecting object in the image is detected.

13 Claims, 12 Drawing Sheets

U.S. PATENT DOCUMENTS

| | | | |
|---|---|---|---|
| 7,697,734 B2* | 4/2010 | Jung et al. | 382/117 |
| 2003/0108225 A1* | 6/2003 | Li | 382/118 |
| 2004/0151350 A1* | 8/2004 | Tafuku et al. | 382/116 |
| 2006/0045317 A1* | 3/2006 | Adachi et al. | 382/118 |
| 2006/0045382 A1* | 3/2006 | Adachi et al. | 382/291 |
| 2007/0292000 A1* | 12/2007 | Ito et al. | 382/118 |

FOREIGN PATENT DOCUMENTS

| | | |
|---|---|---|
| JP | 7-249128 | 9/1995 |
| JP | 8-153197 | 6/1996 |
| JP | 11-339017 | 12/1999 |
| JP | 2001-126027 | 5/2001 |
| JP | 2004-129022 | 4/2004 |
| JP | 2004-234367 | 8/2004 |
| JP | 2004-234494 | 8/2004 |

OTHER PUBLICATIONS

William K Pratt, "Digital Image Processing", 2001, ISBN: 0-471-22132-5, pp. 469-476.*

Japanese Office Action mailed Jul. 14, 2009 and issued in corresponding Japanese Patent Application 2007-503531.

International Search Report mailed Apr. 12,12005 in International Application No. PCT/JP2005/002468 (2 pages).

* cited by examiner

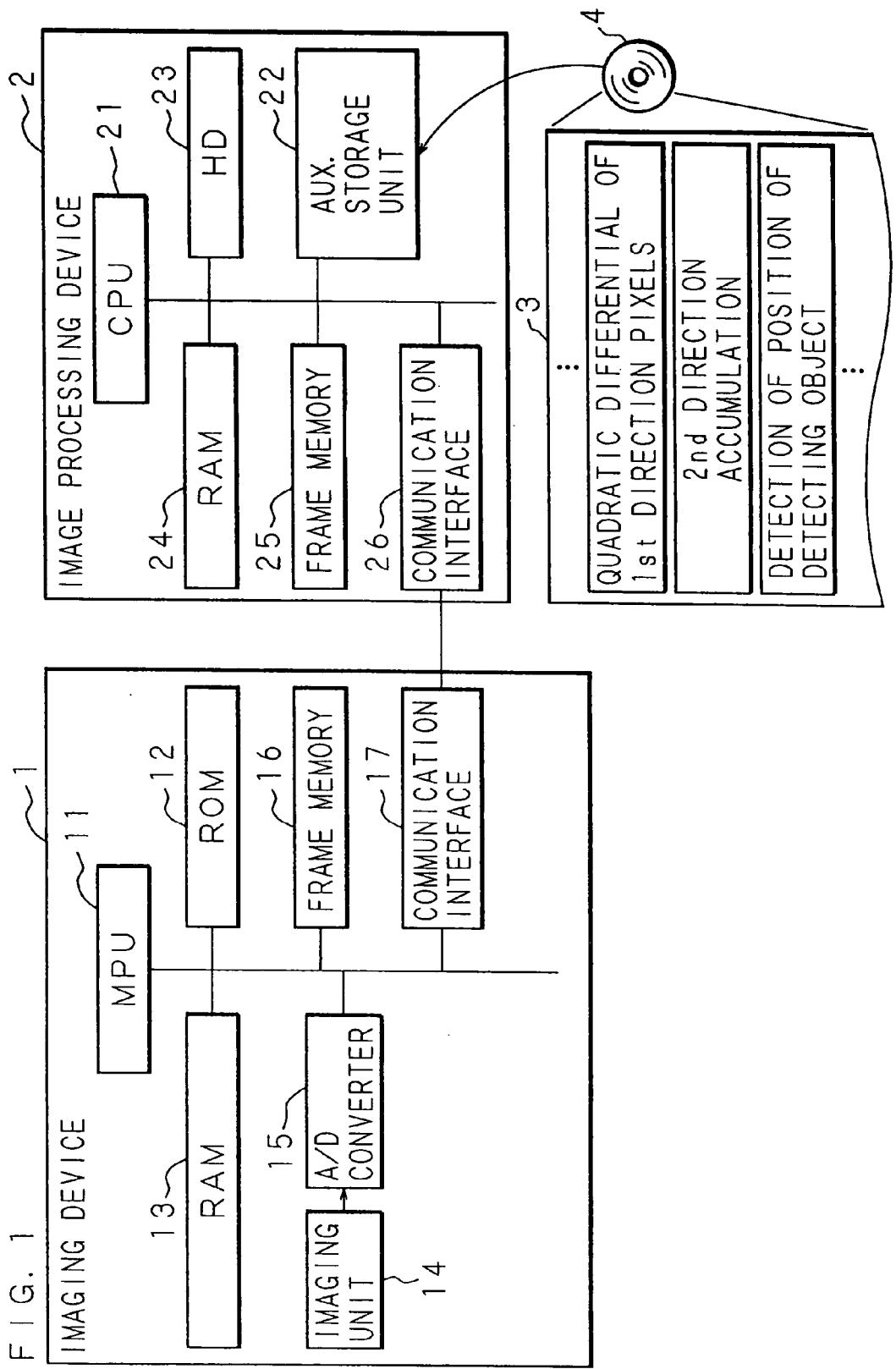

F I G. 6
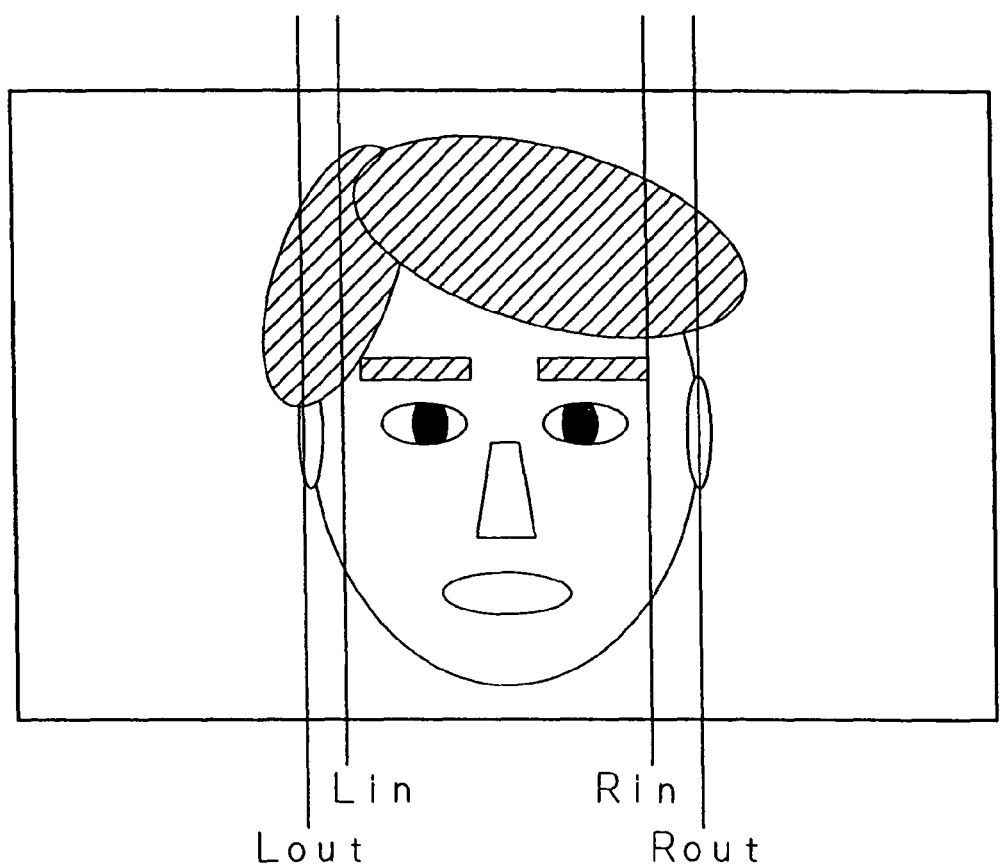

FIG. 9

| 1 | 1 | 1 |
|---|---|---|
| 1 | −8 | 1 |
| 1 | 1 | 1 |

F I G. 1 1
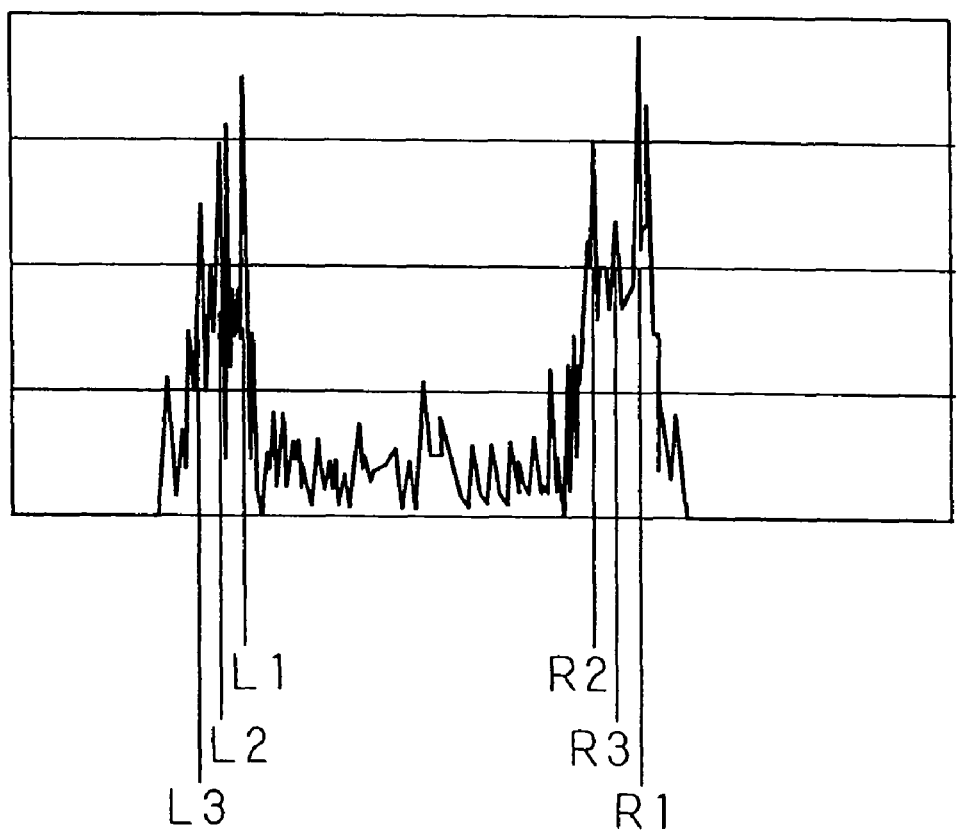

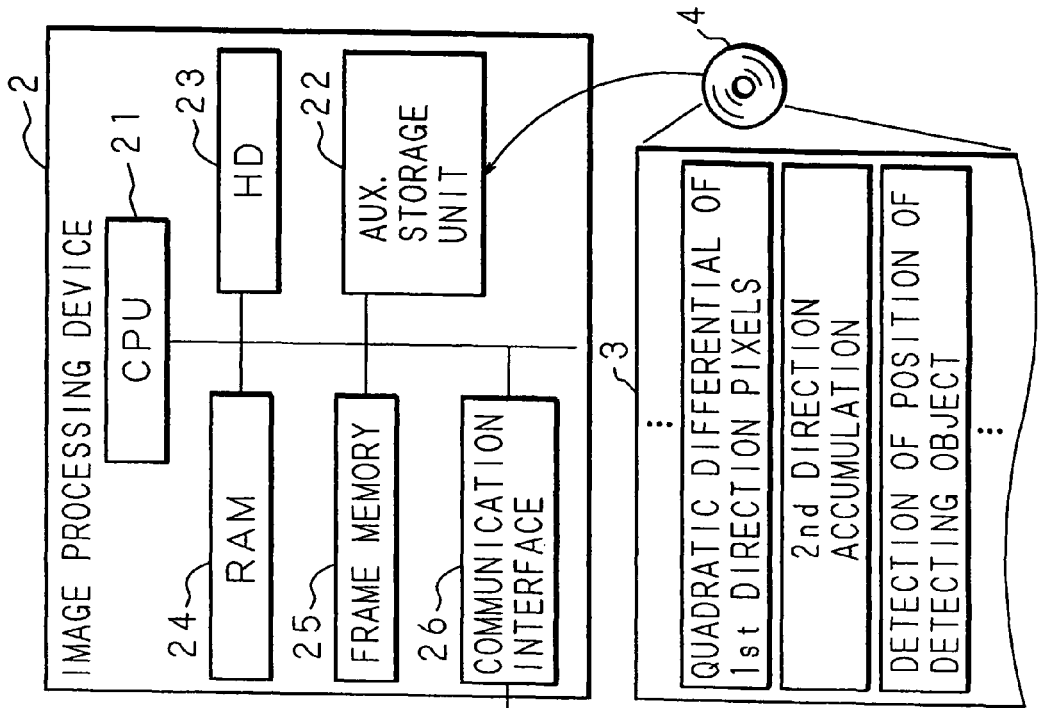
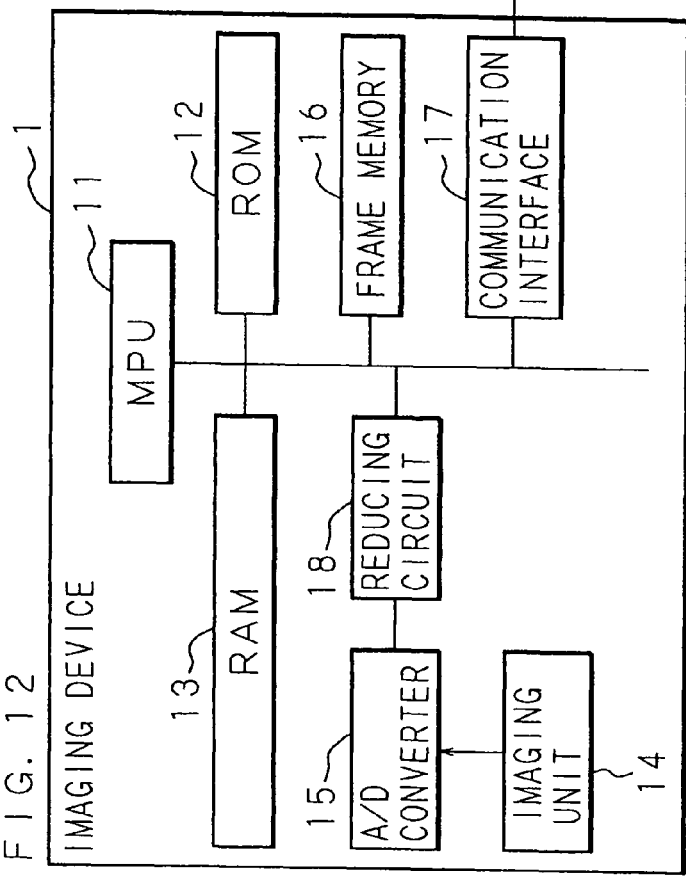
FIG. 12

IMAGE PROCESSING METHOD, IMAGE PROCESSING SYSTEM, IMAGE PROCESSING DEVICE, AND COMPUTER PROGRAM

CROSS-REFERENCE TO RELATED APPLICATIONS

This application is a continuation of PCT International Application No. PCT/JP05/002468 which has an International filing date of Feb. 17, 2005 and designated the United States of America.

BACKGROUND

1. Field of the Invention

The present invention relates to an image processing method using an image processing device for detecting a specific detecting object from an image including a plurality of two-dimensionally arranged pixels, an image processing system to which the image processing method is applied, an image processing device used in the image processing system, and a computer program product for realizing the image processing device, and particularly relates to the image processing method, the image processing system, the image processing device, and the computer program product for improving a detection precision of the detecting object.

2. Description of Related Art

As a device to support driving a vehicle such as an automobile, there is proposed an image processing device for imaging a face of a driver by using an on-vehicle camera disposed at a position capable of imaging the face of the driver and performing image processing of detecting an outline of the face, positions of eyes and a nostril of the driver from the obtained image (for example, see Japanese Patent Application Laid-Open No. 2004-234367). By using such a device, it is possible to configure a system capable of detecting a condition of the driver and performing driving support such as a warning in accordance with the condition of the driver such as an inattentive driving and a drowsy driving. In addition, the situation that external light such as west sun shines in the face of the driver in the vehicle is intricately generated. Therefore, although an illuminance of the face of the driver during driving is not constant, a certain degree of adjustment is made by an auto gain function of the on-vehicle camera, so that a luminance of an image obtained by imaging the face of the driver becomes constant.

However, when the external light such as solar beam, reflective light, or the like is uniformly irradiated to the face of the driver, it is possible to respond to such a case by the auto gain function. However, when the external light is not uniformly irradiated, and the illuminance varies locally, the auto gain function for adjusting the luminance of an overall image can not respond to this case. For example, when one-sided variation occurs so that only left half of the face is exposed to direct solar beam, a dark portion of the face not exposed to direct solar beam can not be recognized as a face, thus generating a problem that an error detection occurs wherein only a bright portion of the face is detected as an outline of the face. In addition, when the error detection is performed to the face, there is a problem that the error recognition is also performed for a region that exists in a center of the face such as positions of eyes and nostrils.

SUMMARY

In view of the above-described circumstances, the present invention is achieved, and an object of the present invention is to provide: an image processing method capable of detecting a position of the face, being the detecting object, with high precision, even when the one-sided variation occurs so that only a part of the face is irradiated with the solar beam, for example, by detecting the position of the detecting object such as the face of the driver shown in the image, based on a result obtained by accumulating data based on the result of quadratic differential in a second direction different from a first direction, after pixels arranged in the first direction of the image obtained by processing such as imaging is subjected to the quadratic differential; an image processing system to which the image processing method is applied; an image processing device used in the image processing system, and a computer program product for realizing the image processing device.

An image processing method according to a first aspect is an image processing method using an image processing device for detecting a specific detecting object from an image including a plurality of two-dimensionally arranged pixels. The image processing method according to the first aspect is characterized by comprising: by the image processing device, quadratic-differentiating pixels arranged in a first direction of an image; by the image processing device, accumulating, in a second direction different from a first direction, data based on quadratic-differentiated results; and by the image processing device, detecting positions of the detecting object in the first direction in the image based on the accumulated results.

According to the image processing method of the first aspect, when the detecting object, for example, is the face of the driver obtained by imaging by an imaging device such as an on-vehicle camera, and even when a local variation of the illuminance occurs to the face of the driver, by an influence of the external light such as west light shining into the vehicle, the position of the detecting object such as an outline of the face can be detected with high precision by using a quadratic differential image hardly influenced by the variation of the illuminance.

An image processing system according to a first aspect is an image processing system including an image processing device for detecting a specific detecting object from an image including a plurality of two-dimensionally arranged pixels, and an image output device for outputting an image to the image processing device. The image processing system according to the first aspect is characterized in that the image processing device comprises: means for quadric-differentiating pixels arranged in a first direction of an image; means for accumulating data based on quadratic differentiated results in a second direction different from the first direction; and detecting means for detecting positions of the detecting object in the first direction in the image based on the accumulated results.

An image processing device according to a first aspect is an image processing device for detecting a specific detecting object from an image including a plurality of two-dimensionally arranged pixels. The image processing device according to the first aspect is characterized by comprising: means for quadric-differentiating pixels arranged in a first direction of an image; means for accumulating data based on quadratic differentiated results in a second direction different from the first direction; and detecting means for detecting positions of the detecting object in the first direction in the image based on the accumulated results.

According to the image processing system and the image processing device of the first aspect, by using the quadratic differential image, the fringe portion of the detecting object can be made noticeable, and by accumulating in the second direction and detecting the position of the detecting object in the first direction, the fringe portion in the first direction can be detected with high precision. For example, when the detecting object is the face of the driver obtained by imaging by the imaging device such as an on-vehicle camera, and even when the variation of the illuminance locally occurs to the face of the driver, the fringe portion of the detecting object such as the outline of the face can be detected with high precision.

An image processing method according to a second aspect is an image processing method using an image processing device for detecting a specific detecting object from an image including a plurality of two-dimensionally arranged pixels. The image processing system according to the second aspect is characterized by comprising: by the image processing device, quadratic-differentiating luminance of pixels for each array of pixels arranged in a first direction of an image; by the image processing device, detecting specified points from each array of the pixels in the first direction, based on the quadric-differentiated results; by the image processing device, accumulating the specified points detected in each array in a second direction different from the first direction; and by the image processing device, detecting positions of the detecting object in the first direction in the image based on the accumulated results.

An image processing system according to a second aspect is an image processing system including an image processing device for detecting a specific detecting object from an image including a plurality of two-dimensionally arranged pixels, and an image output device for outputting an image to the image processing device. The image processing system according to the second aspect is characterized in that the image processing device comprises: means for quadratic-differentiating luminance of pixels for each array of pixels arranged in a first direction of an image; means for detecting specified points from each array of the pixels in the first direction, based on the quadric-differentiated results; means for accumulating the specified points detected in each array in a second direction different from the first direction; and means for detecting positions of the detecting object in the first direction in the image based on the accumulated results.

An image processing device according to a second aspect is an image processing device for detecting a specific detecting object from an image including a plurality of two-dimensionally arranged pixels. The image processing device according to the second aspect is characterized by comprising: means for quadratic-differentiating luminance of pixels for each array of pixels arranged in a first direction of an image; means for detecting specified points from each array of the pixels in the first direction, based on the quadric-differentiated results; means for accumulating the specified points detected in each array in a second direction different from the first direction; and means for detecting positions of the detecting object in the first direction in the image based on the accumulated results.

According to the image processing method, the image processing system, and the image processing device of the second aspect, by using the quadratic differential image, the fringe portion of the detecting object can be made noticeable, and by accumulating, for example, the number of specified points with high possibility of being the fringe portion in the second direction, the precision of detecting the position of the fringe portion in the first direction can be improved. In addition, for example, when the detecting object is the face of the driver obtained by imaging by the imaging device such as an on-vehicle camera, and even when the variation of the illuminance locally occurs to the face of the driver, an adverse influence due to the local variation of the illuminance is suppressed and the fringe portion of the detecting object such as the outline of the face can be detected with high precision, because the image is the quadratic differential image.

An image processing method according to a third aspect is characterized in that the specified points are minimum points obtained by quadric-differentiating a variation of the luminance of the pixels in the first direction.

An image processing system according to a third aspect is characterized in that the specified points are minimum points obtained by quadric-differentiating a variation of the luminance of the pixels in the first direction.

An image processing device according to a third aspect is characterized in that the specified points are minimum points obtained by quadric-differentiating a variation of the luminance of the pixels in the first direction.

According to the image processing method, the image processing system, and the image processing device of the third aspect, a minimum point obtained from the result of the quadratic differential, where a variation state of the luminance changes, is defined as the specified point, thus making it possible to detect the outline of the face, which is a boundary line between the background and the face, as the specified point where the variation state of the luminance changes, when the detecting object, for example, is the face of the driver obtained by imaging by the imaging device such as an on-vehicle camera, and even when the illuminance of the face of the driver is not uniform. This makes it possible to detect the detecting object with high precision.

An image processing method according to a fourth aspect is characterized by further comprising, by the image processing device, setting reference points in the array of the pixels arranged in the first direction, wherein the detection of the positions in the first direction is performed based on a position where accumulated values of the specified points become largest values, and a position where the accumulated values become the values smaller than the largest value by a predetermined rate on the different side of the reference point from the aforementioned position.

An image processing system according to a fourth aspect is characterized in that the image processing device further comprises means for setting reference points in the array of the pixels arranged in the first direction, wherein the detecting means performs the detection based on a position where accumulated values of the specified points become largest values, and a position where the accumulated values become the values smaller than the largest value by a predetermined rate on the different side of the reference point from the aforementioned position.

An image processing device according to a fourth aspect is characterized by further comprising means for setting reference points in the array of the pixels arranged in the first direction, wherein the detecting means performs the detection based on a position where accumulated values of the specified points become largest values, and a position where the accumulated values become the values smaller than the largest value by a predetermined rate on the different side of the reference point from the aforementioned position.

According to the image processing method, the image processing system, and the image processing device of the fourth aspect, for example, the position considered to be closer to a center of the detecting object than a previous detection result is set as a reference points, and the detecting object is detected based on the position where an accumulated value of the number of specified points are maximum, and the position where the accumulated value is, for example, ½ of the largest value, thus making it possible to detect the detecting object with high precision.

An image processing method according to a fifth aspect is an image processing method using an image processing device for detecting a specific detecting object from an image including a plurality of two-dimensionally arranged pixels. The image processing method according to the fifth aspect is characterized by comprising: by the image processing device, quadratic-differentiating a luminance of pixels for each array of pixels arranged in a first direction of an image; by the image processing device, accumulating a quadric-differential value of each array in a second direction different from the first direction; and by the image processing device, detecting positions of the detecting object in the first direction in the image based on the accumulated results.

An image processing system according to a fifth aspect is an image processing system including an image processing device for detecting a specific detecting object from an image including a plurality of two-dimensionally arranged pixels, and an image output device for outputting an image to the image processing device. The image processing system according to the fifth aspect is characterized in that the image processing device comprises: quadric-differentiating means for quadratic-differentiating a luminance of pixels for each array of pixels arranged in a first direction of an image; accumulating means for accumulating a quadric-differential value of each array in a second direction different from the first direction; and detecting means for detecting positions of the detecting object in the first direction in the image based on the accumulated results.

An image processing device according to a fifth aspect is an image processing device for detecting a specific detecting object from an image including a plurality of two-dimensionally arranged pixels. The image processing device according to the fifth aspect is characterized by comprising: quadric-differentiating means for quadratic-differentiating a luminance of pixels for each array of pixels arranged in a first direction of an image; accumulating means for accumulating a quadric-differential value of each array in a second direction different from the first direction; and detecting means for detecting positions of the detecting object in the first direction in the image based on the accumulated results.

According to the image processing method, the image processing system, and the image processing device of the fifth aspect, by using the quadratic differential image, the fringe portion of the detecting object can be made noticeable, and by accumulating the quadratic differential values of the luminance with high possibility of being the fringe portion, for example, the precision of detecting the fringe portion in the first direction can be improved. In addition, when the detecting object, for example, is the face of the driver obtained by imaging by the imaging device such as an on-vehicle camera, and even when the variation of the illuminance locally occurs to the face of the driver, the adverse influence due to the local variation of the illuminance is suppressed and the fringe portion of the detecting object such as the outline of the face can be detected with high precision, because the image is the quadratic differential image.

An image processing method according to a sixth aspect is characterized in that the quadric-differentiation is a two-dimensional Laplacian filtering processing.

An image processing system according to a sixth aspect is characterized in that the quadric-differentiating means performs a two-dimensional Laplacian filtering processing.

An image processing device according to a sixth aspect is characterized in that the quadric-differentiating means performs a two-dimensional Laplacian filtering processing.

According to the image processing method, the image processing system, and the image processing device of the sixth aspect, by applying Laplacian filtering processing, the fringe portion of the detecting object is made noticeable, and quadratic differential processing suitable to the detection of the position of the detecting object can be performed.

An image processing method according to a seventh aspect is characterized by further comprising: after carrying out the quadric-differentiation, by the image processing device, determining reference values of the quadric-differential values based on frequence distribution of the quadric-differential values; and by the image processing device, converting the quadric-differential values of the pixels, being determined reference values or more, into predetermined values; wherein the accumulation in the second direction is performed by accumulating the quadric-differential values having been converted into the predetermined values.

An image processing system according to a seventh aspect is characterized in that the image processing device further comprises: means for determining reference values of the quadric-differential values based on frequence distribution of the quadric-differential values after carrying out quadric-differential by the quadric-differentiating means; and means for converting the quadric-differential values of the pixels, being determined reference values or more, into predetermined values; and the accumulating means accumulates the quadric-differential values having been converted into the predetermined values.

An image processing device according to a seventh aspect is characterized by further comprising: means for determining reference values of the quadric-differential values based on frequence distribution of the quadric-differential values after carrying out quadric-differential by the quadric-differentiating means; and means for converting the quadric-differential values of the pixels, being determined reference values or more, into predetermined values; wherein the accumulating means accumulates the quadric-differential values having been converted into the predetermined values.

According to the image processing method, the image processing system, and the image processing device of the seventh aspect, for example, in order to extract 30% of pixels having high values out of the entire histograms representing a distribution of the quadratic differential values, the quadratic differential values corresponding to the position of 30% of frequence distributed in an upper side are determined as the reference values, and the pixels having the quadratic differential values greater than the determined reference values, namely, the quadratic differential values of 30% of the pixels having high values are converted into predetermined values, for example, upper limit values. Thus, the values of high quadratic differential values are emphasized, thus making it possible to make the fringe portion noticeable, and a detection precision of the fringe portion of the detecting object can be improved.

An image processing method according to a eighth aspect is characterized by further comprising, by the image processing device, generating an image for quadratic differential by reducing an original image before quadratic-differentiating.

An image processing system according to a eighth aspect is characterized in that the image processing device further comprises means for generating an image for quadratic differential by reducing an original image before quadratic-differentiating.

An image processing device according to a eighth aspect is characterized by further comprising means for generating an image for quadratic differential by reducing an original image before quadratic-differentiating.

According to the image processing method, the image processing system, and the image processing device of the eighth aspect, by quadratic-differentiating a reduced image, a processing amount of the quadratic differential processing with large processing load is reduced, and the processing load is reduced, thus making it possible to realize a high-speed processing.

An image processing method according to a ninth aspect is characterized in that the image processing device comprises an imaging device for generating the image, the detecting object is a face of a person generated by the imaging device, the first direction is a horizontal direction, the second direction is a vertical direction, and positions detected by the detection in the horizontal direction are positions of an outline of the person.

An image processing system according to a ninth aspect is characterized in that the image output device is an imaging device for generating the image, the detecting object is a face of a person generated by the imaging device, the first direction is a horizontal direction, the second direction is a vertical direction, and positions detected by the detecting means are positions of an outline of the person in the horizontal direction.

An image processing device according to a ninth aspect is characterized in that an imaging device for generating the image is connected thereto, the detecting object is a face of a person generated by the imaging device, the first direction is a horizontal direction, the second direction is a vertical direction, and positions detected by the detecting means are positions of an outline of the person in the horizontal direction.

According to the image processing method, the image processing system, and the image processing device of the ninth aspect, the outline of the face in a horizontal direction, i.e. the width of the outline of the face can be detected with high precision, when the face of the driver is obtained by imaging by the imaging device such as an on-vehicle camera, and even when the variation of the illuminance locally occurs to the face of the driver by the influence of the external light such as west light shining into the vehicle.

According to the computer program product of the present invention, by executing by a computer such as an on-vehicle computer, with the imaging device such as an on-vehicle camera connected thereto, a general purpose computer is operated as an image processing device of the present invention, and by using the quadratic differential image, the fringe portion of the detecting object can be made noticeable, and by accumulating in the second direction and detecting the fringe portion of the detecting object in the first direction, the fringe portion in the first direction can be detected with high precision. For example, the fringe portion of the detecting object such as the outline of the face can be detected with high precision, when the detecting object is the face of the driver obtained by imaging the imaging device such as an on-vehicle camera, and even when the variation of the illuminance locally occurs to the face of the driver.

The image processing method, the image processing system, the image processing device as described above, and the computer program product according to the present invention are applied to a system of detecting the face of the driver as the detecting object, from the image obtained by imaging the face of the driver by the imaging device such as an on-vehicle camera mounted on a vehicle, and the luminance of the pixels arranged in the first direction of the image, i.e. in the horizontal direction is subjected to the quadratic differential, and the data based on the results of the quadratic differential are accumulated in the second direction, i.e. in the vertical direction, and based on the accumulated results, the positions in the first direction of the detecting object in the image are detected.

With this configuration, even when the variation of the illuminance locally occurs to the face of the driver by the influence of the external light such as west sun light shining into the vehicle, the fringe portion of the detecting object such as the width of the outline of the face can be detected with high precision, because the quadratic differential image hardly influenced by the variation of the illuminance is used.

Specifically, in the image processing system, and the like of the present invention, the specified points such as minimum points are detected based on the results of the quadratic differential in the first direction, the number of the positions of the detected specified points are accumulated in the second direction, then the position considered to be closer to the center of the detecting object than the previous detection result is set as the reference position, and the detecting object is detected based on the positions where the accumulated value of the specified points become the largest value and the positions where the accumulated value becomes ½ of the largest value.

With this configuration, the fringe portion of the detecting object can be made noticeable, because the quadratic differential is used, and for example, when the detecting object is the face of the driver obtained by imaging by the imaging device such as an on-vehicle camera, and even when the variation of the illuminance locally occurs to the face of the driver, an excellent effect is exhibited such that the fringe portion of the detecting object such as the outline of the face can be detected with high precision by suppressing the adverse influence by the local variation of the illuminance, because the image is the quadratic differential image. In addition, by defining as the specified points the minimum points obtained from the results of the quadratic differential, where the variation condition of the luminance changes, the outline of the face, being the boundary line between the background and the face, can be detected as the point where the variation condition of the luminance changes, even when the illuminance of the face of the driver is not uniform. Therefore, the excellent effect can be exhibited, such that the detecting object can be detected with high precision. Then, by improving the precision of detection of the detecting object, the condition of the driver is sensed, and when applied to the system in which driving support such as warning of the inattentive driving is performed, an excellent effect is exhibited, such that a reliable driving support system with little error detection can be configured, even when driving is performed under an environment where the condition of the external light always changes.

In addition, in the image processing system, and the like of the present invention, in order to extract 30% of pixels having high quadratic differential values of all by the quadratic differential processing such as a two-dimensional Laplacian filtering processing, based on the histograms representing a frequence distribution of the quadratic differential values obtained by quadratic-differentiating the luminance of the pixels in the first direction, the quadratic differential values corresponding to the 30% of the frequence distributed at the upper side are determined as the reference values, and the pixels having the quadratic differential values greater than the determined reference values, namely, the quadratic differential values of the pixels of 30% having high values are, for example, converted into predetermined values, i.e. the upper limit values, which are then accumulated in the second direction, and based on the accumulated results, the detecting object is detected.

With this configuration, the fringe portion of the detecting object can be made noticeable, because the quadratic differential image is used, and when the detecting object is the face of the driver obtained by imaging by the imaging device such as an on-vehicle camera, and even when the variation of the illuminance locally occurs to the face of the driver, an excellent effect is exhibited such that the fringe portion of the detecting object such as the outline of the face can be detected with high precision by suppressing the adverse influence due to the local variation of the illuminance, because the image is the quadratic differential image. In addition, since the values of the 30% of pixels with high quadratic differential values are converted into the upper limit values, an excellent effect is exhibited such that high values of the quadratic differential values are emphasized, thus making it possible to make the fringe portion noticeable and the detection precision of the fringe portion of the detecting object can be improved. Then, by improving the precision of the detection of the detecting object, the condition of the driver is sensed, and an excellent effect is exhibited such that the reliable driving support system with little error detection can be configured when applied to the system of performing driving support such as warning of the inattentive driving, and even when the driving is performed under an environment where the condition of the external light always changes.

In addition, as a pre-processing, by quadratic-differentiating a generated image after reducing it, the processing load can be reduced by reducing the processing amount of the quadratic differential processing with large processing load. Accordingly, when applied to the system of performing the driving support, an excellent effect is exhibited, such that high-speed processing can be realized and the driving support system capable of responding to an impromptu situation can be configured.

The above and further objects and features of the invention will more fully be apparent from the following detailed description with accompanying drawings.

BRIEF DESCRIPTION OF THE SEVERAL VIEWS OF THE DRAWINGS

FIG. 1 is a block diagram showing a configuration example of an image processing system according to an embodiment 1 of the present invention;

FIG. 6 is an explanatory view conceptually showing the example of a detection result of a detecting object for the image in the image processing system according to the embodiment 1 of the present invention;

FIG. 9 is an explanatory view showing the example of coefficients used in a Laplacian filtering processing of the image processing system according to the embodiment 2 of the present invention;

FIG. 11 is a graph showing the example of the distribution of accumulated values of quadratic differential values in which a part of the values are converted in the image processing system according to the embodiment 2 of the present invention; and FIG. 12 is a block diagram showing the configuration example of the image processing system according to the embodiment 3 of the present invention.

DETAILED DESCRIPTION

Figure 2:
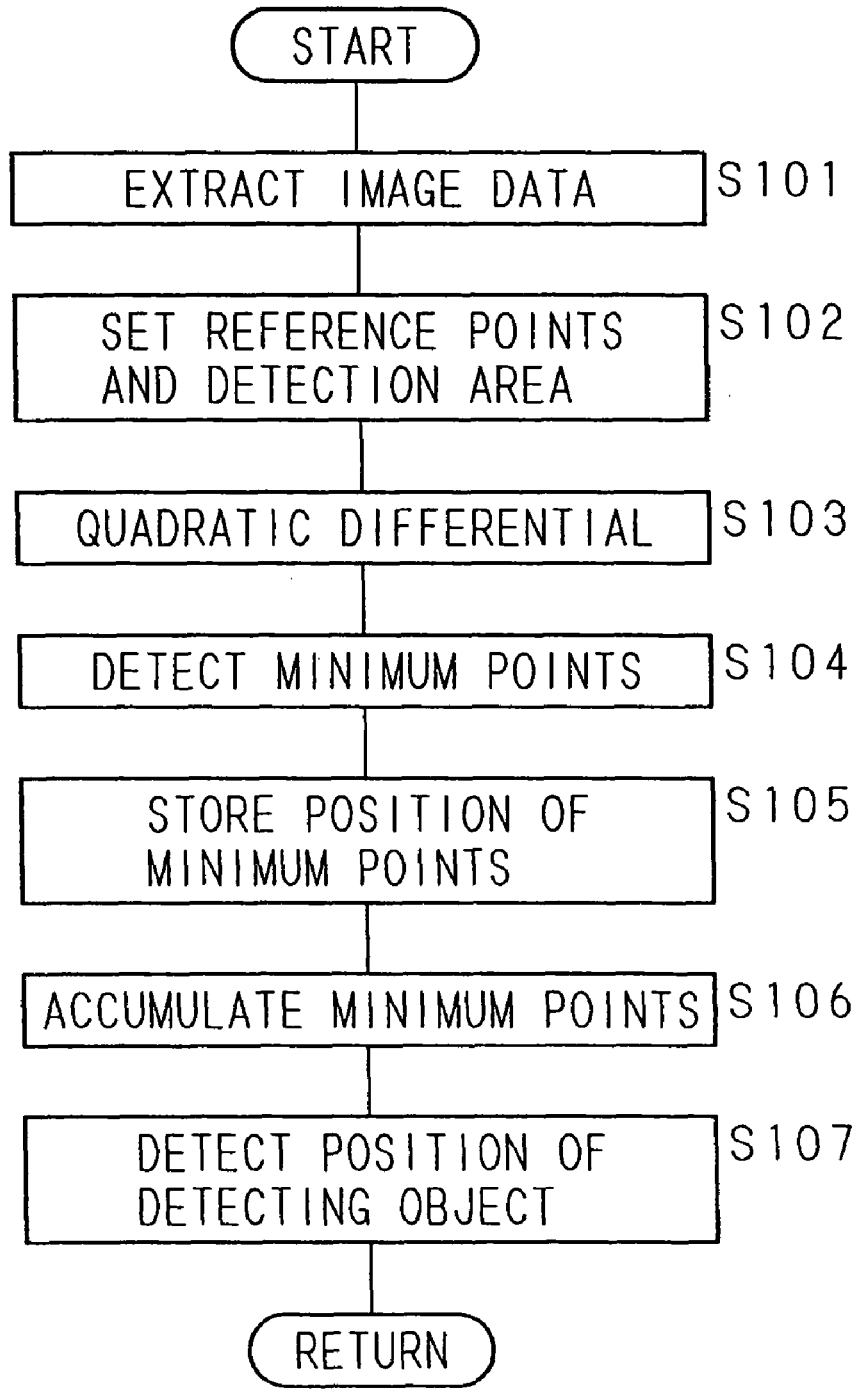
FIG. 2 is a flowchart showing a processing of the image processing device used in the image processing system according to the embodiment 1 of the present invention.

Embodiments of the present invention will be described in detail hereunder based on the drawings.

Embodiment 1

FIG. 1 is a block diagram showing a configuration example of an image processing system according to an embodiment 1 of the present invention. In FIG. 1, 1 denotes an imaging device such as an on-vehicle camera mounted on a vehicle, and the imaging device 1 is connected to an image processing device 2 such as an on-vehicle computer for performing image processing through a communication line such as an exclusive cable, or a communication network such as an in-vehicle LAN (Local Area Network) constituted by wire or wireless. The imaging device 1 is disposed in front of the driver such as on a steering wheel or dashboard in the vehicle, and is adjusted to be capable of imaging the face of the driver as an imaging object, so that the lateral or vertical face of the driver is positioned in a horizontal direction and a vertical direction of an image.

The imaging device 1 includes an MPU (Micro Processing Unit) 11 for controlling an entire body of the device; a ROM (Read Only Memory) 12 for recording each kind of computer program and data executed based on the control by the MPU 11; a RAM (Random Access Memory) 13 for storing each kind of data temporarily generated at the time of executing the computer program recorded in the ROM 12; an imaging unit 14 constituted by using imaging elements such as a CCD (Charge Coupled Device); an A/D converter 15 for converting analog image data obtained by imaging by the imaging unit 14 into digital data; a frame memory 16 for temporarily storing the image data converted into the digital data by the A/D converter 15; and a communication interface 17 used for the communication with the image processing device 2.

In the imaging device 1, imaging processing is performed successively or intermittently by the imaging unit 14, and based on the imaging processing, 30 pieces of image data (image frames) are generated per one second, for example, and the image data thus generated is outputted to the A/D converter 15. In the A/D converter 15, each pixel constituting an image is converted into digital image data expressed by a gradation such as 256 gradations (1 Byte), which is then recorded in the frame memory 16. The image data stored in the frame memory 16 is outputted to the image processing device 2 from the communication interface 17 at a predetermined timing. Each pixel constituting an image is two-dimensionally arranged. The image data includes data showing a position of each pixel expressed by a plane orthogonal coordinates system, i.e. so-called an x-y coordinates system, and showing the luminance of each pixel expressed as a gradation value. Note that instead of showing the coordinates by the x-y coordinates system for each pixel, the coordinates may be shown for each pixel by an order of an arrangement in the data. Also, the horizontal direction of the image corresponds to the x-axial direction of the image data, and the vertical direction of the image corresponds to the y-axial direction of the image data.

The image processing device 2 includes a CPU (Central Processing Unit) 21 for controlling an entire device; an auxiliary storage unit 22 such as a CD-ROM drive for reading information from a recording medium 4 such as a CD-ROM in which each kind of information such as a computer program 3 and data is recorded; a hard disk (referred to as HD hereunder) 23 for recording each kind of information read by the auxiliary storage unit 22; a RAM 24 for storing each kind of data temporarily generated at the time of executing the computer program 3 recorded in the HD 23; a frame memory 25 constituted by a nonvolatile memory; and a communication interface 26 used for the communication with the imaging device 1. Then, by reading each kind of information such as the computer program 3 and the data are read from the HD 23, which are then stored in the RAM 24, and by executing each kind of procedure included in the computer program 3 by the CPU 21, the on-vehicle computer is operated as the image processing device 2 of the present invention. The data recorded in the HD 23 includes the data on executing the computer program 3, for example, various data such as data of a detection area as will be described later.

The image processing device 2 accepts the image data outputted from the imaging device 1 by the communication interface 26, stores the accepted image data in the frame memory 25, reads the image data stored in the frame memory 25, and performs various image processing. The various image processing applied to the accepted image data is the various processing regarding the detection of the detecting object such as detecting an outline of the face and locating positions of eyes and nose of the driver, being the detecting object (imaging object at the time of imaging) from the image data, and is the processing described in documents such as Japanese Patent Application Laid Open No. 2004-234494, Japanese Patent Application Laid Open No. 2004-234367, filed by the applicant of the present invention. Note that the aforementioned image processing is not necessarily limited to the processing described in Japanese Patent Application Laid Open No. 2004-234494 and Japanese Patent Application Laid Open No. 2004-234367, and can be suitably selected in accordance with conditions such as its purpose of use, hardware configuration, and cooperation with other application program.

Next, the processing of each kind of device used in the image processing system according to the embodiment 1 of the present invention will be explained. FIG. 2 is a flowchart showing a processing of the image processing device 2 used in the image processing system according to the embodiment 1 of the present invention. By the control of the CPU 21 that executes the computer program 3 stored in the RAM 24, the image processing device 2 extracts from the frame memory 25 the image data obtained by imaging by the imaging device 1 and accepted through the communication interface 26 (S101), and sets the reference points in a pixel array arranged in the horizontal direction (fist direction) and the detection area in the image represented by the extracted image data (S102). The set reference points are the points considered to have high possibility of having a center line in the vertical direction of the face of the driver, being the detecting object, and are estimated from the previous detection result recorded in the HD 23 or stored in the RAM 24. However, the set reference points are not necessarily required to exist on the center line of the face. The center line in the vertical direction of the face of the driver is represented by x-coordinates indicating the vertical direction in the image shown by the image data. Then, in step S102, the points corresponding to the x-coordinates are set in the pixel array arranged in the horizontal direction. The detection area is a rectangular region which is set in the image for detecting the detecting object, and whose one side having high possibility of detecting the detecting object is parallel to the horizontal direction of the image. Therefore, a load of detecting processing can be reduced not by detecting the detecting object from an overall image, but by narrowing down the area.

By the control of the CPU 21, the image processing device 2 quadratic-differentiates the luminance of the pixels in the pixel arrays arranged in the horizontal direction of the image, by a predetermined calculation toward outside from the reference points (S103), and based on the result of the quadratic differential, detects the minimum points in each pixel array in the horizontal direction (S104), and stores in the RAM 24 the positions (x-coordinates) of the minimum points, being a detection result (S105). The detection and storage of the minimum points for the pixel arrays in the horizontal direction are performed for all pixel arrays in the detection area of the image. In addition, a minimum point distribution table, in which the detected minimum points are stored, is formed in the RAM 24. Note that instead of forming the minimum point distribution table in the RAM 24, it may be formed in the HD 23.

Then, by the control of the CPU 21, the image processing device 2 accumulates the minimum points of each pixel array stored in the minimum point distribution table formed in the RAM 24 in the vertical direction (second direction) (S106), and based on the accumulated result, detects the position (x-coordinates) of the detecting object in the horizontal direction (S107). The accumulation in step S106 is the processing of summing up the positions (x-coordinates) of the minimum points of each pixel array and calculating the number of the minimum points per each position. The positions in the horizontal direction detected in step S107 are the position where the accumulated value of the specified points becomes largest at each side of the reference points, and the position where the accumulated value becomes ½ of the largest value at the outside of the position where the accumulated value becomes largest. Namely, the position where the accumulated value becomes the largest value at the left side, the position where the accumulated value becomes ½ of the largest value at the outside of this position, the position where the accumulated value becomes the largest value at the right side, and the position where the accumulated value becomes ½ of the largest value at the outside of this position are detected as the positions in the horizontal direction of the detecting object, with respect to the face of the driver, which is the detecting object.

As a result, the image processing device 2 records the detection result in the HD 23 and/or stores the detection result in the RAM 24, performs each kind of image processing such as detecting the positions of the eyes and nostrils based on the detection results, and performs driving support processing based on the results.

Figure 3:
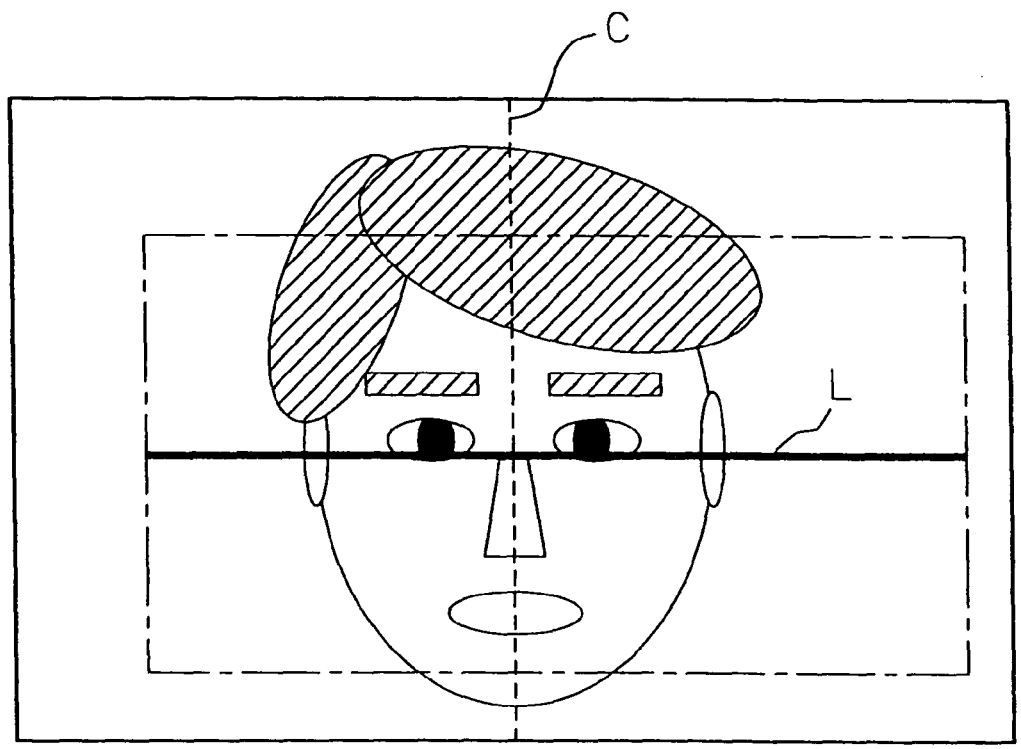
FIG. 3 is an explanatory view conceptually showing an example of the processing from extracting an image to setting reference points and detection area in the image processing system according to the embodiment 1 of the present invention.

The processing explained by using the flowchart of FIG. 2 will be more specifically explained. FIG. 3 is an explanatory view conceptually showing the example of the processing from extracting the image to setting the reference points and the detection area of the image processing system according to the embodiment 1 of the present invention. In FIG. 3, an outside frame shown by solid line is an overall image represented by the image data extracted in step S101, and includes the image of the face of the driver, which is the detecting object. An inside frame shown by one dot chain line is the detection area set in step S102. A thick line L in a lateral direction of FIG. 3 shows the pixel arrays arranged in the horizontal direction for constituting the image, and a broken line in a vertical direction is a center line C of the face of the driver. An intersecting point of the center line C and the pixel array becomes the reference point set in step S102.

Figure 4A:
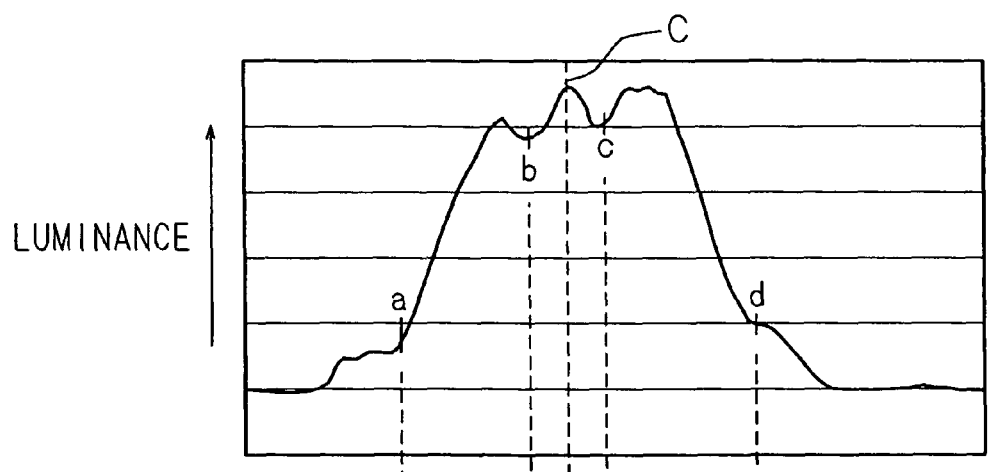
FIG. 4A and FIG. 4B are explanatory views showing the examples of distributions of a luminance of the image in a horizontal direction in the image processing system according to the embodiment 1 of the present invention.
Figure 4B:

FIG. 4A and FIG. 4B are explanatory views showing the examples of distributions of a luminance of the image in a horizontal direction in the image processing system according to the embodiment 1 of the present invention. FIG. 4A shows the distribution of the luminance of the pixels arranged in the horizontal direction at the position of the thick line L of the image shown by using FIG. 3. The luminance becomes high in the vicinity of the center line C of the face of the driver, namely, at the position corresponding to the nose, and the luminance becomes lower toward outside from the center line C. In this way, the distribution of the luminance that becomes higher at the position closer to the imaging device 1 is remarkable by disposing an illuminating device near the imaging device 1. The processing of step S103, wherein the luminance of the pixel arrays thus distributed is subjected to quadratic differential, is performed by calculation using a following expression 1.

$$F(x,n) = A(x-n) + A(x+n) - 2 \times A(x) \qquad \text{expression 1}$$

wherein $F(x, n)$: quadratic differential values at position x
x: x-coordinates of the pixel array in the horizontal direction
n: constant number (2 and 3 here)
$A(x)$: luminance value at position x Then in step S104, the positions (x-coordinates), where the quadratic differential values $F(x, n)$ calculated by the expression 1 satisfy the following condition, are detected as the minimum points.

FIG. 4B shows the positions on the pixel arrays of the minimum points by x marks, which are detected based on the results obtained by quadratic-differentiating the distribution of the luminance shown in FIG. 4A.

$$F(x,2) < N \qquad \text{expression 2}$$

$$F(x,3) < N \qquad \text{expression 3}$$

x satisfying both of expression 2 and expression 3 (logical multiplication of the expressions 2 and expression 3 is a true value)
wherein N: a predetermined threshold value In the example shown in FIG. 4A and FIG. 4B, four points shown as point a, point b, point c and point d are detected as the minimum points based on the results obtained by carrying out quadratic differential. The point a shown in FIG. 4A corresponds to the outline of the left side face of FIG. 3, the point b almost corresponds the fringe portion of the nose from the base of the nose to the nostril, the point c almost corresponds to the fringe portion of the right side nose of FIG. 3, and the point d almost corresponds to the position of the outline of the face, respectively. However, in the detection of the minimum points in step S104, there is a possibility that the minimum points are detected, for example from the background which is not the face of the detecting object. Accordingly, the luminance of the pixels are subjected to quadratic differential toward the outside from the reference points, and when the results satisfy a predetermined condition, it is so judged that the position is highly possibly the background, and the quadratic differential in this image array is ended.

The example of setting three conditions is shown here as predetermined conditions. A first condition is a case of detecting a second minimum point. When the luminance of the pixels is subjected to quadratic differential toward the outside from the reference points, as shown in FIG. 4A, the minimum points are detected at two points such as the fringe portion of the nose and the outline of the face. Therefore, after a third point, the position is judged to be the background. Note that the two points in this case are the two points when the luminance of the pixels is subjected to quadratic differential from the reference points to one direction, and it is subjected to quadratic differential in the right direction and in the left direction. Therefore, the minimum points of maximum four points are detected as the entire pixel arrays. A second condition becomes a case that the variation of the luminance values is a predetermined value or less. For example, when the luminance is shown as gradation values classified into 256 stages, and when the pixels having luminance difference of 16 or less from one pixel are successive by 35 pixels from the one pixel, the position is judged to be the background. A third condition is a case that the luminance value becomes a predetermined threshold value or less. When any one of the first condition, second condition and third condition thus set is satisfied, the quadratic differential carried out for the corresponding pixel array from the reference points to one direction is ended.

Figure 5:
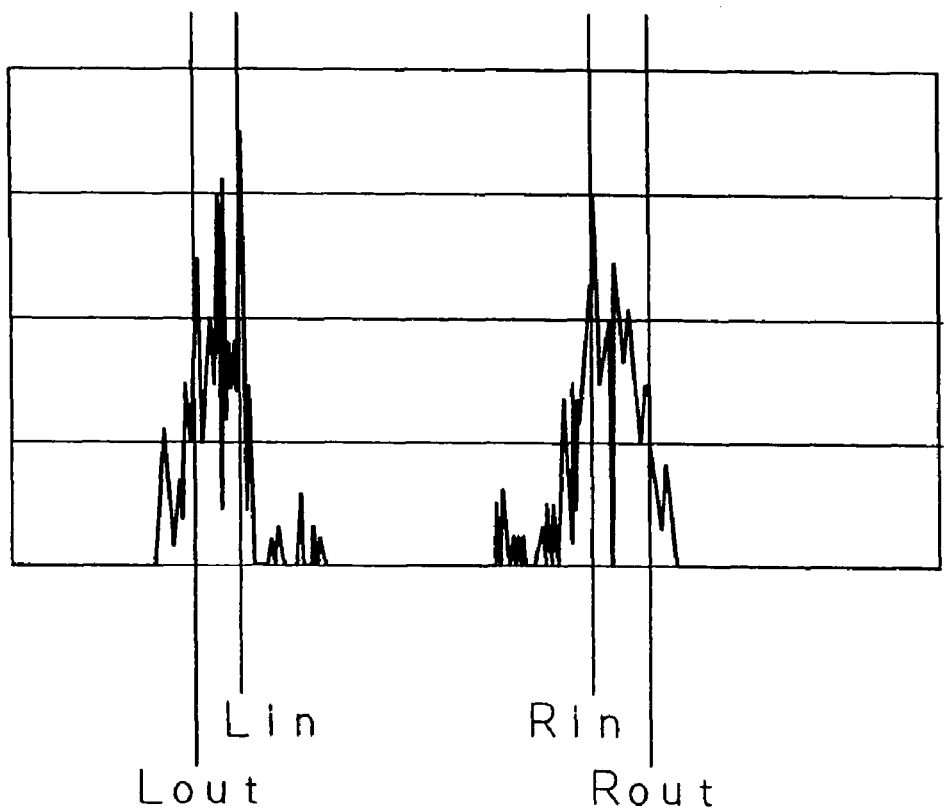
FIG. 5 is a graph showing an example of the distribution of accumulated values of minimum points of the luminance of the image in the image processing system according to the embodiment 1 of the present invention.

FIG. 5 is a graph showing the example of the distribution of the accumulated values of the minimum points of the luminance of the image of the image processing system according to the embodiment 1 of the present invention. FIG. 5 is a graph showing the results obtained by accumulating the minimum points in step S106 detected in step S104, and the abscissa axis corresponds to the horizontal direction of the image, and the ordinate axis shows a frequence of the minimum points. As shown in FIG. 5, when the minimum points are accumulated in the vertical direction, the distribution of the frequence has an appearance of having a peak in the vicinity of the outline of both sides of the face of the driver, being the detecting object. Here, in the peak of the left side facing FIG. 5, the position where the accumulated value becomes largest is defined as a position Lin, and the position, where the accumulated value becomes ½ of the largest value at the outside of the position where the accumulated value becomes largest value, is defined as a position Lout. In the same way, in the peak of the right side facing FIG. 5, the position where the accumulated value becomes largest is defined as a position Rin, and the position, where the accumulated value becomes ½ of the largest value at the outside of the position where the accumulated value becomes largest, is defined as a position Rout.

FIG. 6 is an explanatory view conceptually showing the example of the detection results of the detecting object for the image of the image processing system according to the embodiment 1 of the present invention. FIG. 6 shows the image showing the face of the driver, being the detecting object, and the position detected based on the accumulated results of the minimum points as shown in FIG. 5. Line shown in the vertical direction in FIG. 6 shows the position Lin, the position Lout, the position Rin and the position Rout detected based on the accumulated results of the minimum points. As shown in FIG. 6, the detected four positions almost correspond to the outline of the detecting object. Namely, as is explained as step S107, the position of the detecting object in the horizontal direction, namely, the position of the outline of the face of the driver, being the detecting object is detected from the accumulated results.

Each kind of condition as shown in the embodiment 1 is only an example, and can be suitably set in accordance with a system configuration and the purpose of use. For example, in step S107, a mode of detecting the position of the detecting object in the horizontal direction based on the position where the accumulated value of the minimum points becomes largest value and the position where the accumulated value of the minimum points becomes ½ of the largest value is shown. However, the present invention is not limited thereto, and the position of the detecting object in the horizontal direction may be detected based on only the position where the accumulated value of the minimum points becomes largest value, or the position in the horizontal direction may be detected based on a value other than ½, namely, an arbitrarily set value lower than the largest value by a predetermined rate.

Embodiment 2

An embodiment 2 shows a mode of carrying out quadratic differential different from that of the embodiment 1. Note that the image processing system according to the embodiment 2 has the same configuration as that of the embodiment 1, and therefore the embodiment 1 is referenced and an explanation is omitted.

Figure 7:
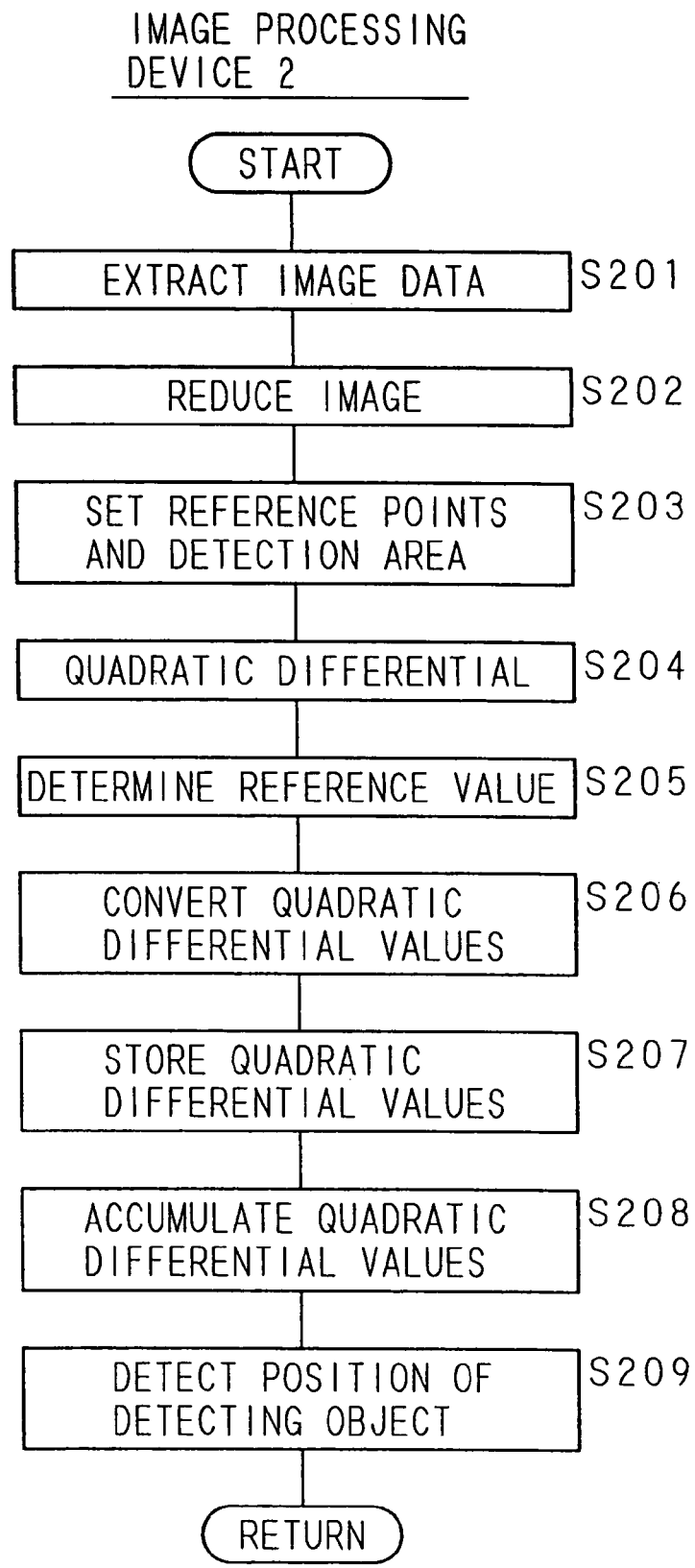
FIG. 7 is a flowchart showing the processing of the image processing device used in the image processing system according to the embodiment 2 of the present invention.

Each kind of processing used in the image processing system according to the embodiment 2 of the present invention will be explained. FIG. 7 is a flowchart showing the processing of the image processing device 2 used in the image processing system according to the embodiment 2 of the present invention. By the control of the CPU 21 that executes the computer program 3 stored in the RAM 24, the image processing device 2 extracts from the frame memory 25 the image data obtained by imaging by the imaging device 1 and accepted through the communication interface 26 (S201), and reduces the image represented by the extracted image data by a rate of ⅛ in the vertical direction and ⅛ in the horizontal direction, for example (S202), and sets the reference points in the pixel arrays arranged in the horizontal direction (first direction) of the image represented by the reduced image data and the detection area (S203). By performing reduction processing, it becomes easy to detect the detecting object at the time of quadratic differential processing in the embodiment 2. Note that by performing the reduction processing, the effect of reducing the processing load at the time of quadratic differential is generated, and therefore the reduction processing may be applied to the embodiment 1. In addition, in the embodiment 2, it is possible to arbitrarily set a reduction rate, and further it is also possible to omit the reduction processing.

By the control of the CPU 21, the image processing device 2 quadratic-differentiates the luminance of the pixels in the pixel arrays arranged in the horizontal direction of the image, by two-dimensional Laplacian filtering processing toward the outside from the reference points (S204), and based on a frequence distribution of the quadratic differential values of the respective pixels, determines the reference value of the quadratic differential values (S205), converts the determined quadratic differential values of the pixels which are more than the reference value into predetermined values (S206), and stores in the RAM 24 the quadratic differential values whose part of the values are converted (S207). The luminance of the image, being the processing object, is indicated as a gradation value classified into 256 gradations, and by carrying out quadratic differential by Laplacian filtering processing for making the fringe portion of the image noticeable, the gradation value of the outline of the face of the driver, being the detecting object, becomes large. In addition, the reference value determined based on the frequence distribution of the quadratic differential values in step S205 is, in this case, the quadratic differential value at the position of 30% of the frequence distributed in the upper side of the gradation values, i.e. the quadratic differential value of 300-th high value when the number of pixels are, for example, 1000. Namely, in the histograms showing the distribution of the quadratic differential values, in order to extract 30% of pixels having high values, the quadratic differential values corresponding to the positions at 30% of the frequence distributed in the upper side are determined as the reference values. As the result, the predetermined value in step S206 is set at the largest value, for example, 255 when the gradation values are 0 to 255. Namely, according to the processing of step S205 to S206, by converting the upper side 30% of the quadratic differential values into the largest value, the outline of the detecting object clarified by the quadratic differential by the Laplacian filtering processing is further emphasized. The processing and storage of the quadratic differential for the pixel arrays in the horizontal direction are performed for all of the pixel arrays within the detection area of the image. In addition, in the RAM 24, a quadratic differential value distribution table is formed for storing the quadratic differential values. Note that the quadratic differential value distribution table may be formed in the HD 23, instead of being formed in the RAM 24.

Then, by the control of the CPU 21, the image processing device 2 accumulates in the vertical direction (second direction) the quadratic differential values of each pixel array stored in the quadratic differential value distribution table formed in the RAM 24 (S208), and based on the accumulated result, detects the position in the horizontal direction (x-coordinates) of the detecting object (S209). The positions in the horizontal direction detected in step S209 are the positions where the accumulated values of the quadratic differential values are the largest values, i.e. the positions where the accumulated values become three points at the upper side out of the largest values.

Then, the image processing device 2 records in the HD 23 the results obtained by detection and/or stores it in the RAM 24, performs each kind of image processing such as detection of the positions of the eyes and nostrils based on the detection result, and performs the driving support processing based on the result thus obtained.

Figure 8:
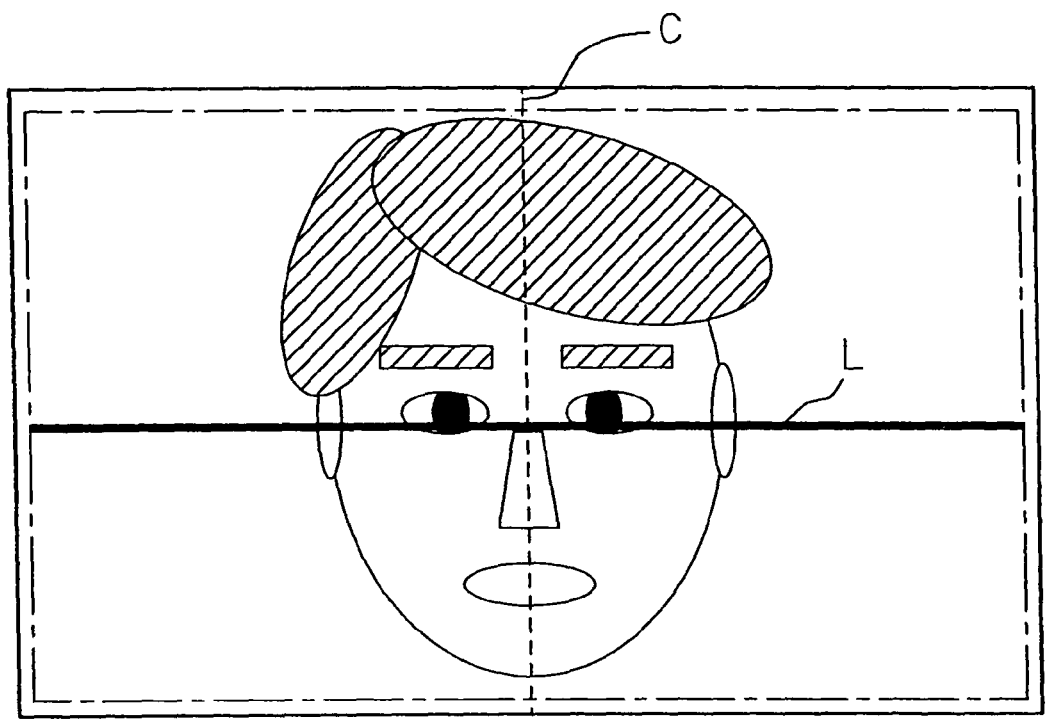
FIG. 8 is an explanatory view conceptually showing the example of the processing from extracting the image to setting the reference points and detection area in the image processing system according to the embodiment 2 of the present invention.

The processing explained using the flowchart of FIG. 7 will be further specifically explained. FIG. 8 is an explanatory view conceptually showing the example of the processing from extracting the image to setting the reference point and the detection area of the image processing system according to the embodiment 2 of the present invention. In FIG. 8, an outside frame shown by solid line is an entire image reduced in step S202, and includes the image of the face of the driver, being the detecting object. An inside frame shown by one-dot chain line is the detection area set in step S203. A thick line L in a lateral direction of FIG. 8 represents the pixel arrays arranged in the horizontal direction for constituting the image, and a broken line in the vertical direction is a center line C of the face of the driver, and intersecting points of the center line C and the pixel arrays are the reference points set in step S203.

Figure 9:
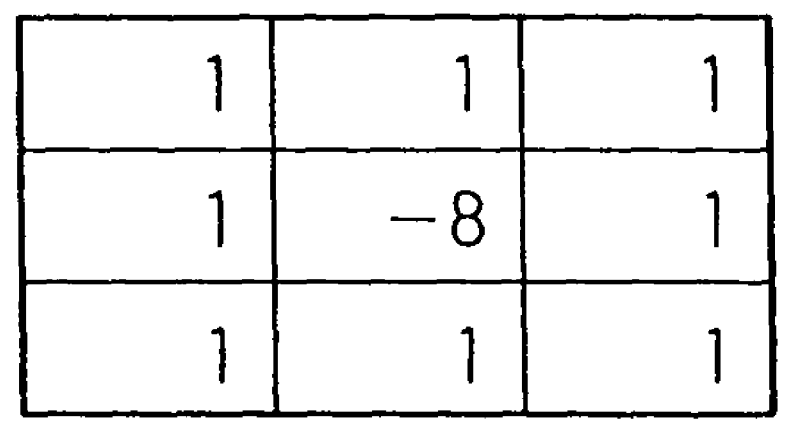

FIG. 9 is an explanatory view showing the example of coefficients used in the Laplacian filtering processing of the image processing system according to the embodiment 2. The two-dimensional Laplacian filtering processing performed in step S204 is the processing of calculating the quadratic differential value of one pixel based on the luminance of the one pixel and the luminance of eight pixels adjacent to each other in upper and lower/right and left directions, with the one pixel set as a center. When the coefficients as shown in FIG. 9 are used, the luminance of the one pixel and the luminance of the eight pixels adjacent thereto are multiplied by the coefficients of the corresponding positions respectively, and a total value of this result becomes the luminance calculated as the quadratic differential value.

Figure 10:
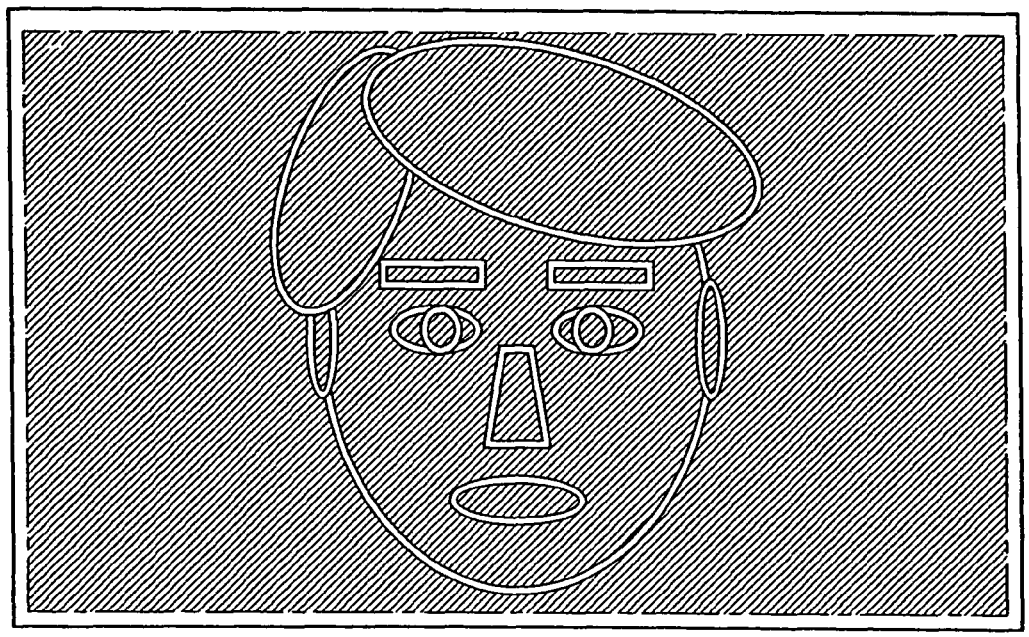
FIG. 10 is an explanatory view showing the example of the image that has undergone the Laplacian filtering processing of the image processing system according to the embodiment 2 of the present invention.

FIG. 10 is an explanatory view showing the example of the image that has undergone the Laplacian filtering processing in the image processing system according to the embodiment 2 of the present invention. By performing the Laplacian filtering processing in step S204, the image exemplified in FIG. 8 is converted into the image shown in FIG. 10 in which the fringe portion such as the outline of the face of the driver, being the detecting object, is clarified.

FIG. 11 is a graph showing the example of the distribution of the accumulated values of the quadratic differential values in which a part of the values are converted in the image processing system according to the embodiment 2 of the present invention. FIG. 11 is a graph showing the result by accumulating in step S208 the values obtained from the result of the processing of steps S204 to S206, and the abscissa axis corresponds to the horizontal direction of the image, and the ordinate axis represents the accumulated values. As shown in FIG. 11, when the quadratic differential values are accumulated in the vertical direction, the graph has peaks in the vicinity of the outline of both sides of the face of the driver, being the detecting object. Here, the position becoming the largest value of a maximum value is defined as L1, and the positions of secondary and thirdly largest values are defined as L2 and L3, respectively, in the peak of the left side facing FIG. 11. In the same way, the position of the largest value of the maximum value is defined as R1, and the positions of the secondary and thirdly largest values are defined as R2 and R3, respectively in the peak of the right side facing FIG. 11. These six points are detected as the candidates of the positions of the outline of the face of the driver, being the detecting object, namely, as the positions with high possibility of being the outline of the face. Then, by using the six points thus detected, further detection processing of the positions of the outline of the driver, for example, the processing such as final determination of the positions of the outline is performed, by comparing them with the positions of the outline detected by other method, for example.

Simply an example is shown as each kind of condition shown in the embodiment 2, and the present invention can be suitably set in accordance with a system configuration and a purpose of use. For example, step S209 shows a mode of detection of the positions of the detecting object in the horizontal direction based on the positions of the right and left three points respectively and based on the maximum value of the accumulated values of the quadratic differential values. However, the present invention is not limited thereto, and the condition can be variously set, wherein only the position where the maximum value becomes largest may be detected.

Embodiment 3

An embodiment 3 has a configuration wherein the processing of reducing the image is performed by the imaging device 1. FIG. 12 is a block diagram showing the configuration example of the image processing system according to the embodiment 3 of the present invention. In FIG. 12, 1 denotes the imaging device, and the imaging device 1 is provided with the MPU 11, ROM 12, RAM 13, imaging unit 14, A/D converter 15, frame memory 16 and communication interface 17, and also a reducing circuit 18 for performing reducing processing of an image.

Then, in the imaging device 1, the imaging processing is performed by the imaging unit 14, the image converted into the digital image data by the A/D converter 15 is reduced by the reducing circuit 18, and the reduced image is stored in the frame memory 16. Then, the reduced image data stored in the frame memory 16 is outputted to the image processing device 2 from the communication interface 17 at a predetermined timing.

The image processing device 2 is provided with the CPU 21, auxiliary storage unit 22 for reading information from the recording medium 4 in which each kind of information such as computer program 3 and data are recorded, and HD 23, RAM 24, frame memory 25, and communication interface 26.

The image processing system according to the embodiment 3 of the present invention performs the processing corresponding to the reducing processing of step 202 of the embodiment 2 by the reducing circuit 18 of the imaging device 1, and outputs the image data representing the image that has undergone the reducing processing to the image processing device 2. The processing in the image processing device 2 is the same as that of the embodiment 2, and therefore the embodiment 2 is referenced and an explanation is omitted. However, needless to say, the reducing processing in step S202 of the embodiment 2 is already performed by the imaging device 1 and therefore is not executed.

The embodiment 3 shows a mode of performing the reducing processing by the imaging device 1. However, by performing a part of or the entire processing of the embodiment 1 and the embodiment 2 by the imaging device 1, the present invention can be developed into further infinitely number of modes.

The embodiments 1 through 3 show the processing applied to the image data represented by a plane orthogonal coordinates system. However, the present invention is not limited thereto, and can be applied to the image data of various coordinate systems, such as being applied to the image data represented by a coordinate system where the first direction and the second direction are intersects with each other at an angle of 60° when processing the image including the pixels arranged in a honeycomb shape, for example.

In addition, the embodiments 1 trough 3 show the mode in which the driver of the vehicle is the detecting object. However, the present invention is not limited thereto, and various persons, further living matters other than the persons, or nonliving matters may be the detecting object.

Further, the embodiments 1 through 3 show the mode of detecting the detecting object from the image generated by imaging by the imaging device using the on-vehicle camera. However, the present invention is not limited thereto, and can be applied to various image processing such as detecting a specific detecting object from the images recorded in the HD, the image being generated by various methods by various devices and being previously recorded in the HD.

As this invention may be embodied in several forms without departing from the spirit of essential characteristics thereof, the present embodiments are therefore illustrative and not restrictive, since the scope of the invention is defined by the appended claims rather than by the description receding them, and all changes that fall within metes and bounds of the claims, or equivalence of such metes and bounds there-of are therefore intended to be embraced by the claims.

The invention claimed is:

1. An image processing method using an image processing device which detects a specific detecting object from an image including a plurality of two-dimensionally arranged pixels, comprising:
   quadratic-differentiating pixels arranged in a first direction of an image by the image processing device;
   determining a reference value of quadratic-differential values based on a frequency distribution of the quadratic-differential values after carrying out said quadratic-differentiating;
   converting a quadratic-differential value of a pixel into a predetermined value for each of the quadratic-differential values of the pixels that is not less than the reference value;
   accumulating data based on the predetermined value into which the quadratic differential value was converted, for the quadratic-differential values of the pixels in a second direction different from the first direction, by the image processing device; and
   detecting positions of the detecting object in the first direction in the image based on accumulated results by the image processing device.

2. An image processing method using an image processing device which detects a specific detecting object from an image which includes a plurality of two-dimensionally arranged pixels, comprising:
   setting reference points in the array of the pixels arranged in a first direction,
   quadratic-differentiating a luminance of pixels for each array of pixels arranged in the first direction of the image by the image processing device;
   detecting specified points from each array of the pixels in the first direction, based on the quadratic-differentiated results by the image processing device;
   accumulating the specified points detected in each array in a second direction different from the first direction by the image processing device; and
   detecting positions of the detecting object in the first direction in the image, based on both a first position where accumulated values of the specified points accumulated by the image processing device become a largest value, and a second position where the accumulated values are smaller than the largest value by a predetermined rate on a different side of one of the reference points from the first position.

3. An image processing method using an image processing device which detects a specific detecting object from an image which includes a plurality of two-dimensionally arranged pixels, comprising:
   quadratic-differentiating a luminance of pixels for each array of pixels arranged in a first direction of an image by the image processing device;
   determining a reference value of quadratic-differential values based on a frequency distribution of the quadratic-differential values after carrying out said quadratic-differentiating;
   converting a quadratic-differential value of a pixel into a predetermined value for each of the quadratic-differential values of the pixels that is not less than the reference value;
   accumulating data based on the predetermined value, into which the quadratic-differential value was converted for each array in a second direction different from the first direction, by the image processing device; and
   detecting positions of the detecting object in the first direction in the image based on the data accumulated by the image processing device.

4. An image processing system, comprising:
   an image processing device which detects a specific detecting object from an image which includes a plurality of two-dimensionally arranged pixels; and
   an image output device which outputs an image to the image processing device, the image processing device including
      a first part which quadratic-differentiates pixels arranged in a first direction of the image;
      a second part which determines a reference value of quadratic-differential values based on a frequency distribution of the quadratic-differential values after carrying out quadratic-differentiating in the first part; and
   a third part which converts a quadratic-differential value of a pixel into a predetermined value for each of the quadratic-differential values of the pixels that is not less than the reference value;
      a fourth part which accumulates data based on the predetermined value into which the quadratic differential value was converted, in a second direction different from the first direction; and
      a detecting part which detects positions of the detecting object in the first direction in the image on the basis of the data accumulated.

5. An image processing device which detects a specific detecting object from an image which includes a plurality of two-dimensionally arranged pixels, comprising:
   a reference part which sets reference points in an array of pixels arranged in a first direction,
   a first part which quadratic-differentiates a luminance of pixels for each array of pixels arranged in the first direction of an image;
   a second part which detects specified points from each array of the pixels in the first direction, based on the quadratic-differentiated results;
   a third part which accumulates the specified points detected in each array in a second direction different from the first direction; and
   a fourth part which detects positions of the detecting object in the first direction in the image based on both a first position where accumulated values of the specified points become a largest value, and a second position where the accumulated values are smaller than the largest value by a predetermined rate on a different side of one of the reference points from the first position.

6. The image processing device as set forth in claim 5, wherein the specified points are minimum points obtained by quadratic-differentiating a variation of the luminance of the pixels in the first direction.

7. The image processing device as set forth in claim 5, further comprising a sixth part which generates an image for quadratic differential by reducing an original image before quadratic-differentiating.

8. The image processing device as set forth in claim 7, wherein
   an imaging device which generates the image is connected to the image processing device,
   the detecting object is a face of a person generated by the imaging device,
   the first direction is a horizontal direction,
   the second direction is a vertical direction, and
   the positions detected by the detecting part are positions of an outline of the person in the horizontal direction.

9. An image processing device which detects a specific detecting object from an image which includes a plurality of two-dimensionally arranged pixels, comprising:

a quadratic-differentiating part which quadratic-differentiates a luminance of pixels for each array of pixels arranged in a first direction of an image;

a determining part which determines a reference value of quadratic-differential values based on a frequency distribution of the quadratic-differential values after carrying out said quadratic-differentiating;

a converting part which converts a quadratic-differential value of a pixel into a predetermined value for each of the quadratic-differential values of the pixels that is not less than the reference value;

an accumulating part which accumulates data based on the predetermined value, into which the quadratic-differential value was converted for each array in a second direction different from the first direction; and a detecting part which detects positions of the detecting object in the first direction in the image based on the data accumulated.

10. The image processing device as set forth in claim 9, wherein the quadratic-differentiating part performs a two-dimensional Laplacian filtering processing.

11. The image processing device as set forth in claim 9, further comprising a third part which generates an image for quadratic differential by reducing an original image before quadratic-differentiating.

12. The image processing device as set forth in claim 11, wherein an imaging device which generates the image is connected to the image processing device, the detecting object is a face of a person generated by the imaging device, the first direction is a horizontal direction, the second direction is a vertical direction, and the positions detected in the detecting part are positions of an outline of the person in the horizontal direction.

13. A computer readable storage encoded with a computer program for controlling a computer that when executed performs a method of detecting a specific detecting object from image data representing an image which includes a plurality of two-dimensionally arranged pixels, comprising:

setting reference points in an array of pixels arranged in a first direction, quadratic-differentiating pixels arranged in the first direction of an image represented by the image data;

detecting specified points from each array of the pixels in the first direction, based on results of said quadratic-differentiating;

accumulating values of the specified points from each array in a second direction different from the first direction; and detecting positions of the detecting object in the first direction in the image based on both a first position where accumulated values of the specified points become a largest value, and a second position where the accumulated values are smaller than the largest value by a predetermined rate on a different side of one of the reference points from the first position.

* * * * *

UNITED STATES PATENT AND TRADEMARK OFFICE
CERTIFICATE OF CORRECTION

| | |
|---|---|
| PATENT NO. | : 7,991,202 B2 |
| APPLICATION NO. | : 11/889994 |
| DATED | : August 2, 2011 |
| INVENTOR(S) | : Ito et al. |

Page 1 of 1

It is certified that error appears in the above-identified patent and that said Letters Patent is hereby corrected as shown below:

Column 19, Line 18, In Claim 1, delete "quadratic differential" and insert --quadratic-differential--, therefor.

Column 20, Line 23, In Claim 4, delete "quadratic differential" and insert --quadratic-differential--, therefor.

Signed and Sealed this
Thirty-first Day of January, 2012

David J. Kappos
*Director of the United States Patent and Trademark Office*